United States Patent Office 3,535,304
Patented Oct. 20, 1970

3,535,304
PROCESS FOR MANUFACTURE OF CO-PRECIPITATES OF MILK PROTEINS
Lawrence Louis Muller, East Bentleigh, Victoria, James Frederick Hayes, Garden Vale, Victoria, Robert Alexander Buchanan, Carrum, Victoria, and Norman Stuart Snow, Beaumaris, Victoria, Australia, assignors to Commonwealth Scientific and Industrial Research Organization, Melbourne, Victoria, Australia, a body corporate
Continuation of application Ser. No. 555,062, June 3, 1966. This application Oct. 24, 1969, Ser. No. 869,397
Claims priority, application Australia, Sept. 17, 1965, 64,190/65
Int. Cl. A23j 1/20
U.S. Cl. 260—120                                    21 Claims

ABSTRACT OF THE DISCLOSURE

The invention relates to a continuous flow process for the production of co-precipitates of milk proteins in the form of a casein and beta-lactoglobulin precipitate, which comprises the steps of (a) adding calcium chloride to skim milk in an amount which is insufficient to cause precipitation at a temperature in excess of 75° C., (b) heating the mixture to at least 75° C., preferably 85–95° C., to cause interaction of the casein and beta-lactoglobulin proteins, (c) holding the heated skim milk for a period of from one-half to thirty minutes to allow the desired degree of interaction to occur, (d) passing the heated and interacted skim milk through a precipitating station, at which an acid, calcium chloride or a mixture thereof rapidly is introduced as precipitant in such a manner as to obtain thorough and rapid mixing with the skim milk so that all the precipitant is added and equilibrium pH attained, and then, (e) allowing the co-precipitate to form as a coagulum during a second holding period, and (f) separating the co-precipitate from the mother liquor or whey.

---

Figure 1:
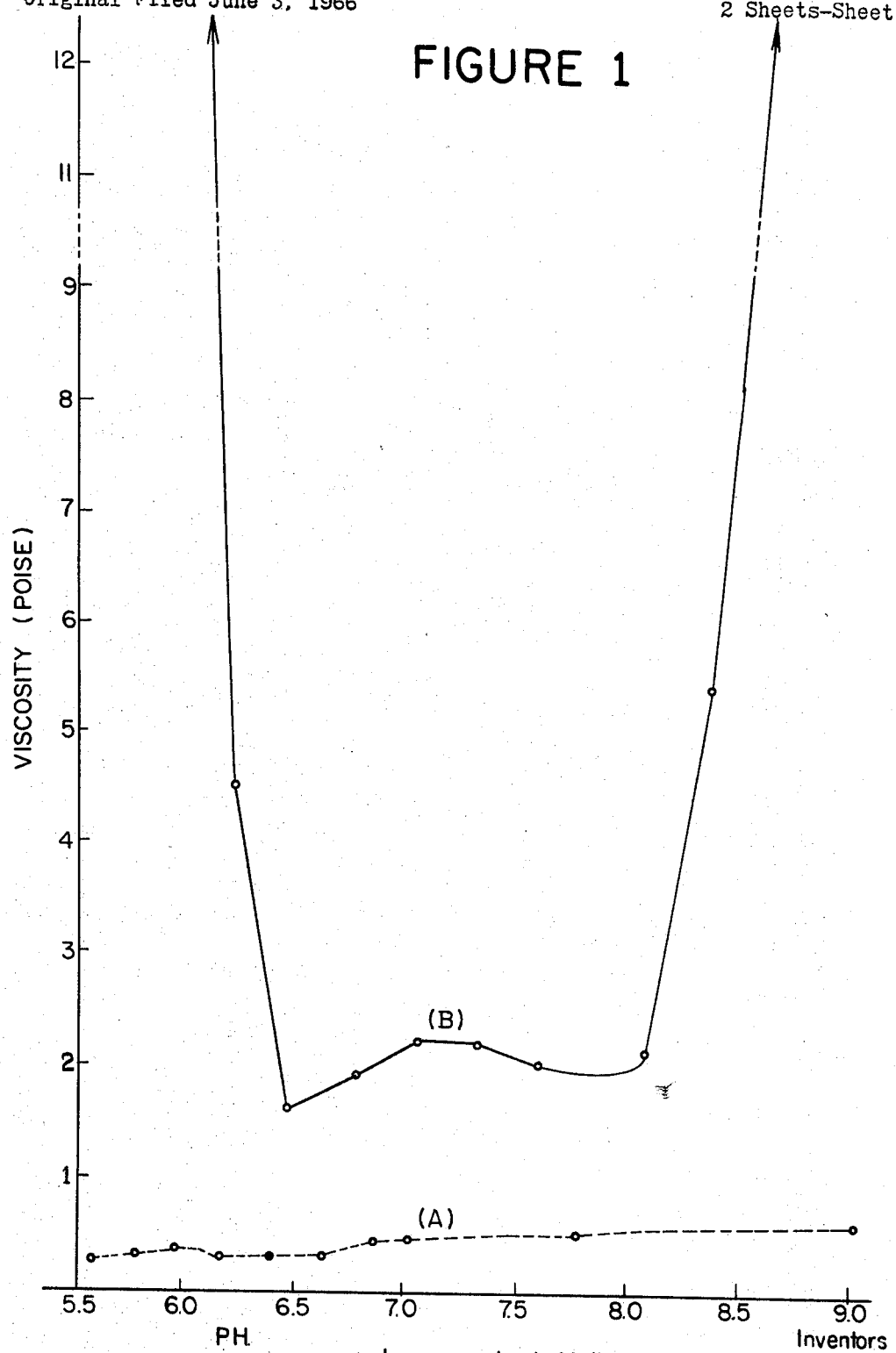

This application is a continuation of our application Ser. No. 555,062 filed June 3, 1966 and entitled "Process for Manufacture of Co-Precipitates of Milk Proteins" now abandoned.

This invention is concerned with the production of co-precipitates of milk proteins and has as its object the provision of an improved process and apparatus which will enable such co-precipitation to be produced with well-controlled physical and chemical properties.

It is well known that when a quantity of skim milk is heated to temperatures above about 75° C. an interaction occurs between the casein and B-lactoglobulin fractions of the milk proteins, and that subsequent addition of acid will form a co-precipitate of the casein-B-lactoglobulin complex together with a proportion of the remaining milk proteins. Known methods for the production of these co-precipitates make use of this knowledge by slowly adding acid to large vats of heated skim milk. In such batch processes, the intention has been to produce a coagulum which entraps as much as possible of the protein, other than those chemically bound to the casein. The extent to which this is achieved depends largely on the conditions of temperature, agitation, acid dilution and rate of addition and unless these conditions are closely controlled the proportion of whey proteins not only may vary significantly from batch to batch, but can very considerably throughout the same batch. Moreover, the products of such batch processes may vary considerably in their physical and chemical properties—such as viscosity, pH, solubility and dispersibility.

Milk protein co-precipitates have been used in human and animal foods as nutritional supplements (where maximum protein content is most desirable) or as functional agents such as emulsifiers, binding agents for water and fat, and the like (where physical properties are important). However, the suitability of the co-precipitates for use in these fields and others is dependent to a large degree upon being able to produce such products to a definite specification—a difficult requirement where commercial scale batch processes are concerned.

Now the present invention arises from the realisation that a continuous process can provide better conditions for the control of process parameters than can a batch-wise process. It is also based on a proper appreciation of the role which calcium plays in the production of the co-precipitates and in the determination of their physical properties. Thus, it has been found that, in known batch processes, there is a strong tendency for the calcium present in the milk to become bound to the protein, the amount of bound calcium (and, therefore, the calcium content of the product) being largely dependent on the rate of acid addition and the efficiency of agitation—both of which can vary greatly from point to point in a large vat. Experiments made in the development of the invention showed that the production of co-precipitates with controllable low or medium calcium contents depends on the rapid establishment of equilibrium pH conditions in the milk before the coagulum aggregates to particles so large as to make difficult the subsequent removal of the calcium by further acid treatment. Accurate and uniform control of pH and the rapid attainment of such equilibrium conditions are therefore most desirable. The continuous process of the present invention provides the means whereby this control and uniformity may readily be obtained.

Accordingly, the invention provides a continuous flow process for the production of co-precipitates of milk proteins, which comprises the steps of: heating skim milk to a temperature sufficient to cause interaction of the milk proteins, holding the heated skim milk at a holding station for a sufficient period to allow the desired degree of interaction to occur, passing the heated and interacted skim milk at a measured rate through a precipitating station, introducing a precipitant, selected from an acid, calcium chloride and mixtures thereof, into the heated and interacted skim milk at said precipitating station and at a rate proportional to said measured rate and so as to obtain thorough and rapid mixing of the precipitant with the skim milk, allowing the co-precipitate to form as a coagulum during a second holding period, and discharging the resultant coagulum-whey mixture into separating means for separating the co-precipitate from the mother liquor or whey.

The holding of the heated skim milk prior to acid injection is important because the resultant thorough interaction of the casein and B-lactoglobulin not only results in the recovery of the B-lactoglobulin but, in the continuous process, it reduces the rate at which the coagulum forms on acid or calcium injection into the hot milk. Without the interaction, the rate of coagulum formation is too fast to permit efficient and thorough mixing of the acid or calcium chloride with the milk.

Furthermore, the interaction also modifies the properties of the curd and it is possible to produce, at a pH somewhat above the isolectric point of the proteins, a co-precipitate capable of normal treatment in conventional casein processing equipment in spite of a fairly high calcium content.

Preferably, the temperature of the milk at precipitation lies between 85 and 95° C., although it may be as low as 75° C. since this appears to be the critical temperature for the necessary protein interaction.

In a particularly efficient and effective form of the invention, calcium chloride is added to the milk prior to heating so as to promote interaction of the whey proteins and the casein during heating, thereby reducing the holding time otherwise necessary and increasing the yield of the process. It is known, of course, that the addition of sufficient calcium chloride to heated skim milk at between 85 and 95° C. will produce a co-precipitate. However, in a preferred form of the invention, calcium chloride is added to the milk prior to heating and the heating itself is conducted in two stages. In the first stage, the milk is raised to a temperature of between 65 and 75° C.—but one which is insufficient to cause precipitation in the heat exchanger or in the subsequent holding station. This is preferably done by passing the milk through a heat exchanger in which the heat retained in the whey is recovered and by which the milk is raised to the required temperature. The milk is then further heated, as by steam injection, at or near the holding station. Introduction of acid, further calcium chloride or both then produces precipitation as before.

In order to achieve accuracy of pH control and ensure the necessary rapid mixing during the acid addition, it is preferred to add the acid to the heated skim milk by injecting it into a pipeline carrying the skim milk by use of a positive action pump to spray the dilute acid or calcium chloride against the flow of heated milk in the pipeline at pressures preferably over 20 lbs. sq. in. through a nozzle giving a cone-shaped discharge. A positive action pump is preferably also used to drive the milk through the pipeline so that the flow rates of both milk and acid are constant and bear a known relationship to each other, thereby ensuring a constant and known pH for the rapidly attained mixture.

Medium calcium levels in the co-precipitate can be achieved through precipitation with acid at pH values above 4.6. If, however, the pH is too high the curd may show "rubbery" properties which impair its handling in normal processing equipment. If calcium levels equivalent to those of curd at such high pH are required, these may be obtained in a curd of good characteristics by the addition of calcium chloride as previously mentioned, the final precipitation being performed with acid at a pH near 4.6.

More efficient recovery of the milk proteins is achieved if, after the acid is sprayed into the milk, the mixture is held for a short time, preferably a minimum of 10 seconds, to allow the coagulum to form before discharge of the mixture onto a screen and riffle chute where the curd separates from the whey. Preferably, following the acid addition, the mixture is allowed to flow without significant turbulence through a further pipeline which constitutes the holding zone for the necessary time.

Table I illustrates typical conditions for production of co-precipitates with varying calcium levels.

TABLE I

| Calcium (Ca$^{++}$), percent in product | Precipitant | pH of precipitation |
|---|---|---|
| 0.1 | Acid | 4.5 |
| 0.5 | do | 4.8 |
| 0.5 | Calcium chloride (0.03%) followed by acid | 4.5 |
| 1.0 | 0.06% calcium chloride followed by acid | 4.6–4.7 |
| 2.0 | do | 5.3–5.4 |
| 3.0 | 0.2% calcium chloride only | 5.8 |

The physical and chemical properties of the co-precipitates are strongly dependent upon the calcium content and pH of precipitation. The co-precipitates are generally insoluble in water but soluble in weak alkalis to a degree which varies with the calcium content. Thus low calcium (0.5% Ca or less) products are soluble at pH 6.0 or above. Medium calcium (0.5% to 2%—more usually 1% to 2%) products when dispersed at "low" pH (5.8 to 6.0) give a whitish dispersion, the protein having low water binding powers; whereas at "high" pH (6.5 to 6.8) the dispersion is a pale opaque liquid in which the protein has high water binding powers. High calcium (above about 2%) products are insoluble in the usual alkalis at pH 6.0 to 7.0 but by using calcium sequestering agents, such as a tripolyphosphate to sequester part of the calcium, dispersions similar to those obtained with the medium calcium co-precipitates can be obtained by using about 2% (at "low" pH) and 6% (at "high" pH) of the agent.

The viscosities of the dispersions of the co-precipitates and the variation of viscosity with pH is also highly dependent on the calcium content. In FIG. 1, curves A and B are plots of pH-viscosity relationships of 10% co-precipitate dispersions at 55° C. Curve A shows a pH-viscosity curve of a dispersion in sodium hydroxide of a co-precipitate containing 0.2% calcium, i.e. a low calcium co-precipitate. Curve B of FIG. 1 of the drawings shows a typical pH-viscosity curve for a high calcium co-precipitate, same being dispersed in 0.6% sodium tripolyphosphate. The extreme dependence of viscosity on pH for this product is evident. Co-precipitates with calcium contents between the two extremes exhibit intermediate pH-viscosity relationships and vary in their requirements for calcium sequestering agents when preparing dispersions.

Figure 2:
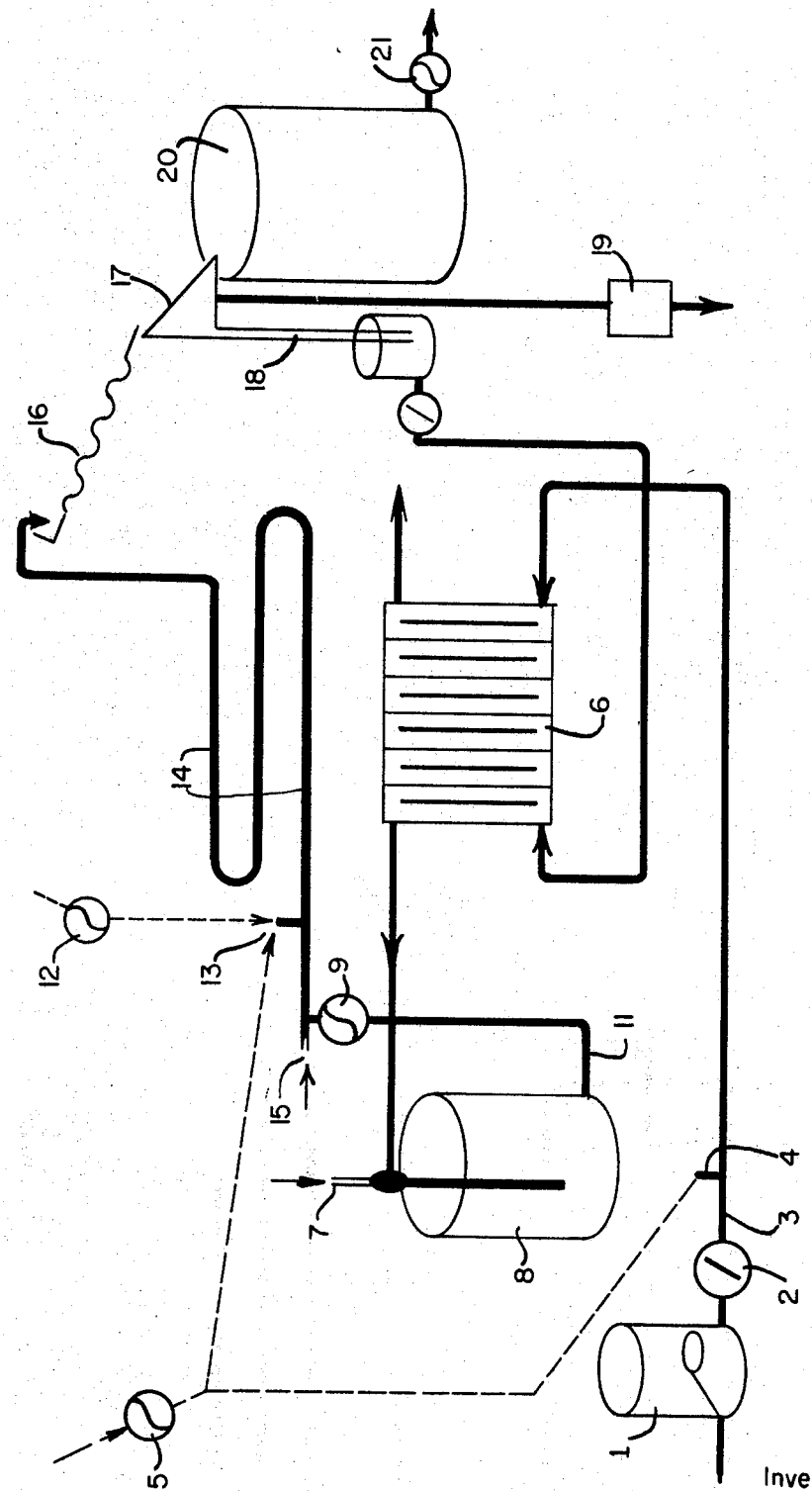

In order that the invention may be more fully understood, typical examples of a process for the production of milk protein co-precipitates in accordance with our invention will now be described with reference to FIG. 2 of the accompanying drawings which shows apparatus for carrying out the process.

EXAMPLE 1

This example describes a continuous process which can be used to produce a co-precipitate of low calcium content. Referring to FIG. 2 skim milk is removed from a storage vessel 1 at a chosen constant rate by means of a pump 2 and pumped through a pipeline 3 to a first mixing station 4 where it is mixed with calcium chloride in an amount of from 0.02 to 0.06%, preferably 0.03%, of the weight of the milk. This mixing is preferably carried out by injecting the calcium chloride into the pipeline by means of a positive action pump 5, feeding a spray nozzle inserted in the pipeline 3. The spray nozzle (not shown) is preferably designed to give a cone-shaped discharge opposite in direction to the milk flow, thereby creating turbulence and ensuring thorough mixing. The mixture of milk and calcium chloride then passes through a plate or tubular heat exchanger 6 where it is heated by means of hot whey produced in a later stage of the process to a temperature of about 65 to 75° C. The heated mixture is then delivered to a steam injection point 7 where steam is injected into the mixture to raise its temperature to that required for precipitation, i.e. 85 to 95° C. The mixture then passes to a holding tank 8, preferably two or more such tanks in series with a capacity sufficient to hold one-third to one-half the hourly flow rate of the plant, for example, if the desired flow rate through the plant is 3000 gallons per hour, the holding tanks should have a total capacity of 1000 to 1500 gallons. The rate of addition is balanced against the rate of removal from the holding stage to give a steady level of milk representing 10 to 30 minutes holding time, preferably 15 to 20 minutes.

A second positive action pump 9 removes milk from the holding tank at the chosen constant rate through a further pipeline 11. A third positive action pump 12 delivers dilute sulphuric or hydrochloric acid to a second mixing station 13 consisting of a spray nozzle (not shown) inserted in the pipeline preferably on the discharge side of the second pump 9. This spray nozzle is also preferably designed to give a cone-shaped discharge opposite in direction to the milk flow. Turbulence caused by this spray and the changes in direction in the milk pipeline complete the rapid mixing of the milk and acid streams and the rapid attainment of a steady pH value throughout the mixture. From the second pump 9, the mixture is conveyed through a further pipeline 14 having a capacity equivalent to 10 to 40 seconds, preferably 15 to 20 seconds, holding time at the flow rate used.

From the holding pipeline 14, the mixture discharges on to a riffle chute 16, the angle of which is adjusted to suit the flow rate, prevent the formation of too large aggregates before the curd and whey reach a separation device 17 comprising an inclined 90 mesh stainless steel screen. The whey is removed from this screen through pipeline 18, a portion being bypassed through the electrodes of a pH recorder 19. The pH of precipitation is accurately adjusted by varying the delivery rate of the acid metering pump 12 so as to achieve a pH in the mixture of between 4.2 and 4.6, preferably 4.55. This operation can of course be automatically controlled if desired. To achieve economy of operation in the process, the hot whey recovered at this stage of the process is recirculated to the heat exchanger as previously described.

The curd discharges from the separation device 17 into a wash tank 20 where it is agitated with water at 25–55° C. depending on curd characteristics, but usually at about 40° C. Extra washing stages may be introduced if required before the curd-water mixture is pumped by pump 21 to another separation device (not shown) before pressing and drying in the normal fashion as in the manufacture of casein. It may be necessary or desirable to add acid, preferably sulphuric acid, to the washing water in order that the water squeezed from the curd at the stage of the pressing operation should have a pH between 4.0 and 4.6.

EXAMPLE 2

A continuous process giving a co-precipitate of high calcium content is similar to that described in Example 1, and essentially the same apparatus may be used as in that example, except that it is normally not necessary to add calcium chloride (at mixing station 4) to the original milk, the holding time for the milk before precipitation is short, and calcium chloride is used as the precipitant. Skim milk is continuously heated as in Example 1, by the heat exchanger 6 and steam injection at 7, and delivered to a balance tank, one of the holding tanks (8) being suitable. The holding time required is only 30 seconds to 2 minutes, preferably 1 minute. The calcium chloride solution is delivered by the metering pump at a steady rate through the spray nozzle at the second mixing station 13. The calcium chloride solution is added at the rate of 0.15 to 0.25, preferably 0.18 to 0.20%, calcium chloride based on the weight of skim milk, the amount in practice being primarily determined by the clarity of the whey emerging from the process. The process then continues as in Example 1 except that it is unnecessary to record the pH of the whey. If desired, steam injection may be carried out at point 15 in pipeline 14 instead of injection point 7.

EXAMPLE 3

A continuous process giving a co-precipitate of medium calcium content is similar to that described in Example 1, except that no calcium chloride is added at the mixing station 4 and except that the pH of the precipitation is higher. The pH selected determined the amount of calcium in the curd. A pH of 4.65 to 4.75 will give calcium levels ranging from 0.2 to 0.8% in the product. Higher pH values up to about 5.5 can be used to obtain higher calcium levels. At the higher pH values there is a tendency for "sticky" or "rubbery" curd characteristics to appear with some milks and this may limit the usefulness of this process if such curds present handling problems in the equipment currently available for separation, washing, pressing and drying.

EXAMPLE 4

If difficulty is experienced at high pH with curd characteristics for a particular milk supply when aiming for calcium levels between 1.0 and 2.0% in the product, a continuous process as in this example may be used. The process is similar to Example 1 except that the quantity of calcium chloride injected at mixing station 4 is greater but still less than that required to achieve precipitation by this means alone. The quantity is chosen in the range 0.04 to 0.10% of the weight of milk, depending on the level of calcium desired in the final product. The desirable holding time for the milk after heating varies with the level of calcium addition. At calcium levels of 0.08 to 0.10% the holding time is in the range of 30 seconds to 5 minutes, preferably 2 minutes. At lower levels of calcium, the holding time should be in the range 5 to 20 minutes; for example, the holding time, when 0.06% calcium is added, is preferably between 10 and 15 minutes.

The final pH of the precipitation chosen is dependent on the level of calcium desired in the product. If, for example, a calcium level of 1% was desired and calcium chloride had previously been added at the rate of 0.06% of the weight of milk, the pH of precipitation would be in the range 4.55 to 4.65 preferably 4.60. If a level of 1.8 to 2.0% calcium was desired in the final product at the same level of calcium chloride addition, the pH of precipitation would be in the range 5.3 to 5.5, preferably 5.4.

It will be appreciated that the process as described above represents a real advance in the production of milk protein co-precipitates from skim milk, particularly with regard to the controllability of the properties of the co-precipitates so obtained. The apparatus required is simple and is readily available in most plants equipped for the production of casein and other milk products. The protein recoveries effected by the process are high. With the high and medium calcium processes as above the whey is very clear and almost free from filterable solids. The total recovery of proteins is about 95–97% representing virtually 100% of the casein and 80–85% of the whey proteins. It appears that the heat treatment is responsible for recovery of about two-thirds of the whey protein, the remaining 15% or so being denatured in the hot whey and entrained as the curd forms in the holding tube.

Similar results can be obtained in the low calcium process when curd characteristics are altered by the addition of calcium chloride, and it is possible to achieve almost the 95–97% as in the other two processes. The actual yields are dependent on the time-temperature combinations used for the heat treatment and also on the calcium levels employed in the pretreatment or precipitation stages.

The range of products produced by the process of this invention have wide end-use possibilities. The low-calcium product should find acceptance in some forms of baby food, ice-cream and coffee whiteners. The medium calcium and high calcium produtcs appear to be best suited to such applications in small goods, biscuits, bread, breakfast cereals and canned processed foods. The variation in colour of dispersions and water-binding powers between the dispersed and "soluble" versions governs the choice of product for particular end-uses.

The higher protein recovery from the milk, the indications of more balanced nutritional value and the fact that the co-precipitates are less susceptible to "gluey" flavour than is casein suggest that these forms of milk protein will prove more useful than casein or caseinates in many food applications.

Typical compositions for the products are shown in Table II.

TABLE II.—TYPICAL COMPOSITIONS OF FORMS OF CO-PRECIPITATE

| | High calcium | | | | Medium calcium | | Low calcium | |
|---|---|---|---|---|---|---|---|---|
| | Granular form | Spraydried | | Granular | Spraydried | | Granular | Spray dried |
| | | Dispersed | Soluble | | Dispersed | Soluble | | |
| Protein, percent | 81.0 | 83.0 | 79.0 | 84.0 | 86.0 | 85.0 | 86.5 | 87.5 |
| Lactose, percent | 1.0 | 1.0 | 1.0 | 1.0 | 1.0 | 1.0 | 1.0 | 1.0 |
| Fat, percent | 1.5 | 1.5 | 1.5 | 1.5 | 1.5 | 1.5 | 1.5 | 1.5 |
| Moisture, percent | 8.0 | 4.0 | 4.0 | 8.0 | 4.0 | 4.0 | 8.0 | 4.0 |
| Ash (including Ca), percent | 8.5 | 10.5 | 14.5 | 5.5 | 7.5 | 8.5 | 3.0 | 6.0 |
| Calcium (as $Ca^{++}$), percent | (3.0) | | | (2.0) | | | (0.5) | |

The invention also includes milk protein co-precipitates whenever made by any of the above-described methods, and apparatus for carrying out the processes described.

We claim:

1. A continuous flow process for the production of co-precipitates of milk proteins in the form of an interacted casein and beta-lactoglobulin precipitate, which consists of the steps of: adding calcium chloride to skim milk in an amount which is insufficient to cause precipitation at a temperature in excess of 75° C., heating the mixture of skim milk and calcium chloride thus obtained to a temperature of at least 75° C. to cause interaction between the casein and beta-lactoglobulin, holding the said heated mixture for a period of from one-half to thirty minutes to allow the desired degree of said interaction between casein and beta-lactoglobulin to occur, passing the said heated mixture containing the interacted casein and beta-lactoglobulin through a precipitating station, rapidly introducing a precipitant, selected from the group consisting of an acid, calcium chloride and mixtures thereof, into the said heated mixture at said precipitating station and at a rate proportional to the rate at which the heated mixture is passed through the precipitating station and so as to obtain thorough and rapid mixing of all the precipitant with the heated mixture and complete attainment of equilibrium pH, then allowing the interacted casein and beta-lactoglobulin precipitate to form as a coagulum during a second holding period and discharging the resultant coagulum-whey mixture into separating means for separating the interacted casein and beta-lactoglobulin precipitate from the mother liquor or whey.

2. A process as claimed in claim 1, wherein the heating step is carried out in two stages, the first stage involving raising the temperature of the mixture of skim milk and calcium chloride to between 65° and 75° C. and the second stage comprising further raising the temperature of the said mixture to between about 85° and 95° C.

3. A process as claimed in claim 2, wherein the first and second stages of the heating step are both carried out prior to the first-mentioned holding step.

4. A process as claimed in claim 2, wherein the first stage of the heating step is carried out prior to the first-mentioned holding step and the second stage of the heating step is carried out subsequent to said holding step.

5. A process as claimed in claim 2, wherein the first stage of the heating step is effected by utilizing heat from the hot whey produced in the process, and the second stage of the heating step is effected by injecting steam into the said mixture.

6. A process as claimed in claim 1, wherein in the second holding step the heated mixture of skim milk and precipitant is held without significant turbulence for at least 10 seconds.

7. A process as claimed in claim 1, wherein the precipitant is introduced into the heated mixture as a cone-shaped discharge in a direction opposite to the flow of the heated mixture.

8. A process as claimed in claim 1 for the production of milk protein co-precipitates in the form of an interacted casein and beta-lactoglobulin precipitate having a calcium content of from about 0.1% to about 0.5% wherein an amount of calcium chloride between about 0.02% and 0.06% is added to the skim milk prior to heating, the casein and beta-lactoglobulin are allowed to interact for a period of time from ten to thirty minutes and the pH then is adjusted to a value between about 4.2 and 4.6.

9. A process as claimed in claim 1, for the production of milk protein co-precipitates in the form of an interacted casein and beta-lactoglobulin precipitate having a calcium content of from about 0.5% to 2.0%, wherein an amount of calcium chloride of from 0.2% to 0.10% is added to the skim milk prior to heating; the casein and beta-lactoglobulin are allowed to interact for a period of from ½ to 20 minutes, and the pH of said mixture then is adjusted to between 4.55 and 5.5.

10. A process as claimed in claim 1 in which the skim milk and calcium chloride mixture is heated between 85° C. and 95° C. to cause the interaction between the casein and beta-lactoglobulin.

11. A continuous flow process for the production of co-precipitates of milk proteins in the form of an interacted casein and beta-lactoglobulin precipitate, which consists of the steps of: heating skim milk to a temperature of at least 75° C. to cause interaction between the casein and beta-lactoglobulin, holding the heated skim milk for a period of from one-half to thirty minutes to allow the desired degree of said interaction between the casein and beta-lactoglobulin to occur, passing the heated skim milk containing the interacted casein and beta-lactoglobulin through a precipitating station, rapidly introducing a precipitant, selected from the group consisting of an acid, calcium chloride and mixtures thereof, into the said heated skim milk at said precipitating station and at a rate proportional to the rate of flow of the heated skim milk to obtain thorough and rapid mixing of all the precipitant with the skim milk and complete attainment of equilibrium pH, then allowing the interacted casein and beta-lactoglobulin precipitate to form a coagulum during a second holding period, and discharging the resultant coagulum-whey mixture into separating means for separating the interacted casein and beta-lactoglobulin precipitate from the mother liquor or whey.

12. A process as claimed in claim 11 for the production of co-precipitates of milk proteins in the form of an interacted casein and beta-lactoglobulin precipitate having a calcium content of from 0.2% to 2.0% wherein the casein and beta-lactoglobulin are allowed to interact for a period of from ten to thirty minutes.

13. A process as claimed in claim 12 wherein the pH lies in the range 4.65 and 5.5 and is attained solely by the addition of acid as precipitant.

14. A process as claimed in claim 11 for the production of co-precipitates of milk proteins in the form of an interacted casein and beta-lactoglobulin precipitate having a calcium content of at least 2.0% wherein the casein and beta-lactoglobulin are allowed to interact for a period of from one-half to ten minutes.

15. A process as claimed in claim 14 wherein calcium chloride alone is used as precipitant.

16. A process as claimed in claim 15 and wherein said resulting interacted casein and beta-lactoglobulin precipitate is solubilized in the preparation for drying by use of a calcium sequestering agent.

17. A process as claimed in claim 11 in which the skim milk is heated between 85° C. and 95° C. to cause the interaction between the casein and beta-lactoglobulin.

18. A process as claimed in claim 11, wherein the stream of precipitant is introduced into the stream of heated skim milk, containing interaction complex of casein and beta-lactoglobulin, as a cone-shaped discharge in a direction opposite to the flow of the stream of heated skim milk.

19. A process as claimed in claim 11, wherein in the second holding step the stream of mixed skim milk and precipitant is held without significant turbulence for at least ten seconds.

20. A co-precipitate of milk proteins in the form of an interacted casein and beta-lactoglobulin precipitate produced from skim milk by the process of claim 1.

21. A co-precipitate of milk proteins in the form of an interacted casein and beta-lactoglobulin precipitate produced from milk by the process of claim 11.

References Cited

UNITED STATES PATENTS

| 1,992,002 | 2/1935 | Chappell | 260—120 |
|---|---|---|---|
| 2,044,282 | 6/1936 | Clickner | 260—120 |
| 2,142,093 | 1/1939 | Clickner | 260—120 |
| 2,369,095 | 2/1945 | Wendt | 260—120 |
| 2,388,991 | 11/1945 | Oatman | 260—120 |
| 2,468,730 | 5/1949 | Block et al. | 260—120 |
| 2,623,038 | 12/1952 | Scott | 260—120 |
| 2,665,989 | 1/1954 | Howard et al. | 99—20 |
| 2,714,068 | 7/1955 | Bernhart et al. | 99—20 |
| 2,744,891 | 5/1956 | Waugh | 260—120 |
| 2,844,481 | 7/1958 | Langworthy | 106—146 |
| 3,218,173 | 11/1965 | Loewenstein | 99—19 |
| 3,323,929 | 6/1967 | Salzberg et al. | 106—148 |
| 3,361,567 | 1/1968 | Engel et al. | 99—20 |

OTHER REFERENCES

Journal of Dairy Science, vol. 39, 1956, pp. 1651–1659, Zittle et al. I.

Journal of Dairy Science, vol. 40, 1957, pp. 280–288, Zittle et al. II.

The Australian Journal of Dairy Technology, vol. 20, No. 3, September 1965, pp. 139–142, Buchanan et al.

HAROLD D. ANDERSON, Primary Examiner

H. SCHAIN, Assistant Examiner

U.S. Cl. X.R.

99—2, 20; 260—112, 119